(12) United States Patent
Yadavalli

(10) Patent No.: US 8,793,747 B2
(45) Date of Patent: Jul. 29, 2014

(54) METHOD AND APPARATUS FOR ENABLING USER FEEDBACK FROM DIGITAL MEDIA CONTENT

(75) Inventor: Srinivas Ramkumar Yadavalli, Suwanee, GA (US)

(73) Assignee: STMicroelectronics, Inc., Coppell, TX (US)

( * ) Notice: Subject to any disclaimer, the term of this patent is extended or adjusted under 35 U.S.C. 154(b) by 0 days.

(21) Appl. No.: 13/411,870

(22) Filed: Mar. 5, 2012

(65) Prior Publication Data

US 2013/0132983 A1 May 23, 2013

Related U.S. Application Data

(60) Provisional application No. 61/562,505, filed on Nov. 22, 2011.

(51) Int. Cl.
*H04N 7/18* (2006.01)
(52) U.S. Cl.
USPC .............................. 725/80; 725/38; 709/219
(58) Field of Classification Search
USPC .................. 725/78–85, 37–61, 133, 141; 709/217–232
See application file for complete search history.

(56) References Cited

U.S. PATENT DOCUMENTS

| | | | |
|---|---|---|---|
| 6,452,923 B1* | 9/2002 | Gerszberg et al. | 370/352 |
| 7,155,448 B2* | 12/2006 | Winter | 711/4 |
| 7,739,715 B2* | 6/2010 | He et al. | 725/90 |
| 8,069,258 B1* | 11/2011 | Howell | 709/230 |
| 2007/0124779 A1* | 5/2007 | Casey et al. | 725/87 |
| 2008/0208751 A1* | 8/2008 | Sparrell | 705/51 |

\* cited by examiner

*Primary Examiner* — Annan Shang
(74) *Attorney, Agent, or Firm* — Leveque IP Law, P.C.

(57) ABSTRACT

An apparatus for enabling feedback from a recipient of media content includes a receiver that receives a content data stream, containing media content and embedded Meta-Data, and a decoder that decodes the content data stream to extract the media content and the Meta-Data. A playback signal dependent upon the extracted content is passed to a content playback device of the content recipient. A control device interface receives a signal from a local control device operated by the content recipient and a network interface provides the desired feedback by accessing a network in accordance with the Meta-Data and the signal from the local control device of the content recipient. The Meta-Data, which may be related to the content, is embedded in the encoded media content data sequence before the sequence is transmitted or at a later stage in the transmission network.

23 Claims, 6 Drawing Sheets

METHOD AND APPARATUS FOR ENABLING USER FEEDBACK FROM DIGITAL MEDIA CONTENT

PRIORITY CLAIM

This application claims priority to provisional application Ser. No. 61/562,505 titled "Mechanism to Enable a Digital Video/Audio Content Driven Feedback in Real-Time Mode", filed Nov. 22, 2011.

BACKGROUND

Delivery of media content, such as television programs, video or music for example, currently depends primarily on unidirectional methods. As a consequence, most viewers or listeners of media content are passive and provide no feedback to the producers (who develop the content) or distributors of the media content. The distributor may add content in the form of commercials or advertisement in between sections of program before the combined content is broadcast to customers or end recipients. The content is displayed at multiple end points and there is no real-time feedback mechanism from the viewers/listeners of the content being played or displayed.

BRIEF DESCRIPTION OF THE FIGURES

The accompanying figures, in which like reference numerals refer to identical or functionally similar elements throughout the separate views and which together with the detailed description below are incorporated in and form part of the specification, serve to further illustrate various embodiments and to explain various principles and advantages.

Figure 1:
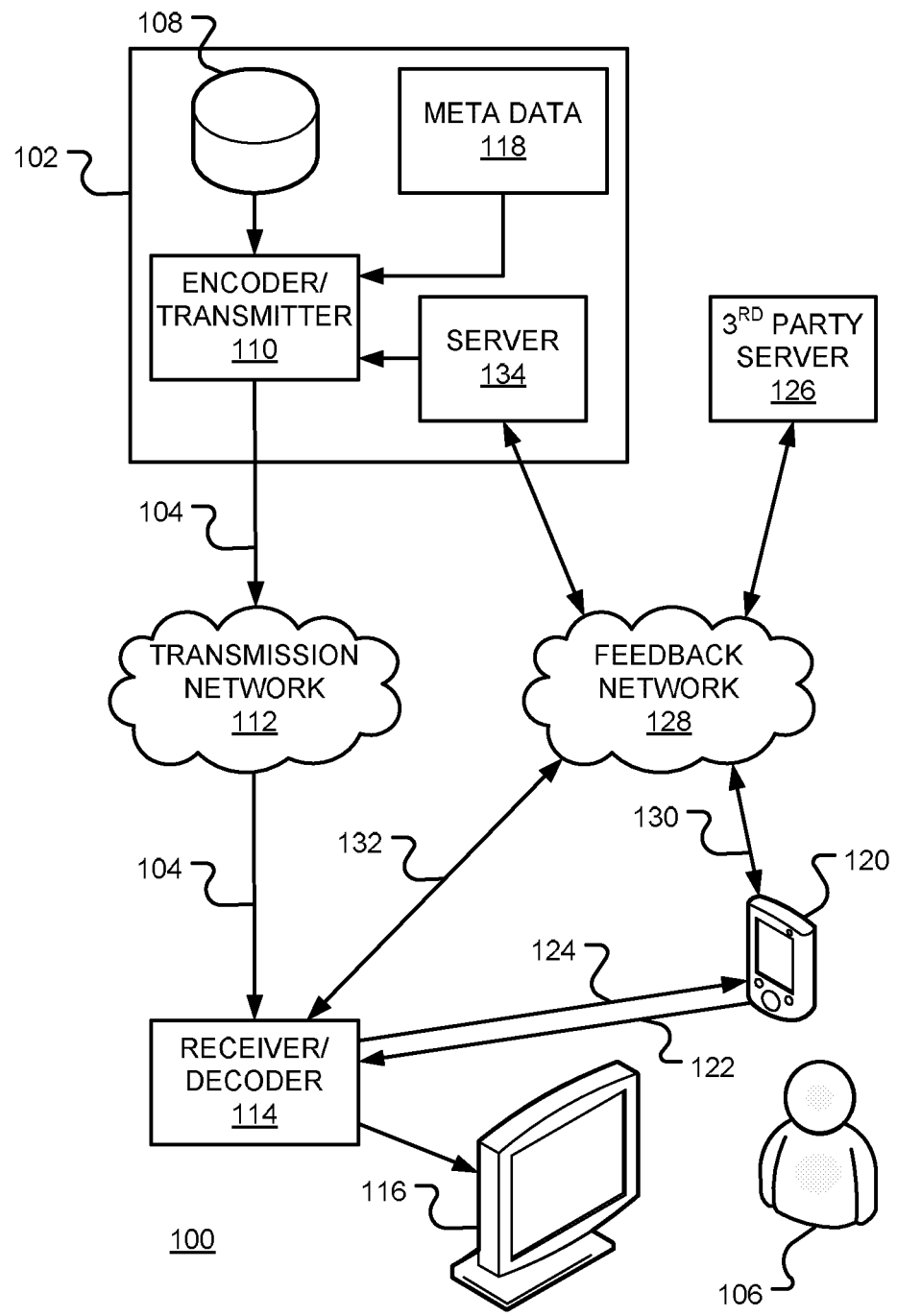
FIG. 1 is a block diagram of an exemplary system for real-time user feedback from digital media content in accordance with some embodiments.

Skilled artisans will appreciate that elements in the figures are illustrated for simplicity and clarity and that some common components have been omitted to help to improve understanding of various embodiments and examples presented herein.

DETAILED DESCRIPTION

Before describing in detail embodiments that are in accordance with the present invention, it should be observed that the embodiments reside primarily in combinations of method steps and apparatus components related to real-time user feedback from digital media content. Accordingly, the apparatus components and method steps have been represented where appropriate by conventional symbols in the drawings, showing only those specific details that are pertinent to understanding the embodiments presented herein so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It will be appreciated that embodiments described herein may comprise one or more conventional processors and unique stored program instructions that control the one or more processors to implement, in conjunction with certain non-processor circuits, some, most, or all of the functions of real-time user feedback from digital media content described herein. The non-processor circuits may include, but are not limited to, a wireless signal receiver, a wireless signal transmitter, signal drivers, clock circuits, power source circuits, and user input devices. As such, these functions may be interpreted as a method to enable real-time user feedback from digital media content. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

One embodiment enables content developers or distributors to embed information in digital media content. Media may comprise video, audio, still pictures or any combination thereof. This enables feedback of valuable inputs from recipients of the content, such as their like, dislikes, tastes from viewers and also provides a mechanism for selling products during live or time-shifted programming. A real-time feedback mechanism is provided that enables a viewer or listener to provide feedback dependent upon content that is currently being played. An exemplary apparatus for enabling feedback from a recipient of media content includes a receiver that receives a content data stream, containing media content and embedded Meta-Data, and a decoder that decodes the content data stream to extract the media content and the Meta-Data. The content to be played back is passed to a content playback device of the content recipient. A control device interface receives a signal from a control device of the content recipient and a network interface provides the feedback by accessing a network in accordance with the Meta-Data and the signal from the local control device of the content recipient. The Meta-Data is embedded in the media content before the content reaches the recipient. The Meta-Data could be inserted before or during transmission or at any stage in the data transmission pipeline. Meta-Data could be inserted by any entity that has access rights to intercept content in legitimate ways/reasons in the content data path from creation to the end recipient via any form of path way (transmission). Additionally, the Meta-Data may be modified at one or stages in the transmission pipeline. For example, the Meta-Data could be adapted based on regional information such as geographical location, recipient attributes (consensual), recipient preferences (consensual), lingual characteristics, gender characteristics or gender preferences.

The Meta-Data may be directly related to the content (such as link to purchase a displayed product), loosely associated with the content (e.g. a link to purchase a movie of the same genre) or may be unrelated to the content (such as a severe weather alert).

FIG. 1 shows an example system 100 for real-time user feedback from digital media content in accordance with some embodiments. Referring to FIG. 1, a content provider 102 provides media content 104 to a content recipient (an end user or viewer) 106 at a remote location. The original digital video content, such as television programs, videos, movies, etc., is retrieved from a storage device 108 and encoded for transmission in encoder 110 and then transmitted over a transmission network 112. The distribution or transmission network 112 may be a public network, such as the Internet or cellular radio network, or a proprietary transmission link, such as a cable, fiber optic or radio link, or any other form of transmission path. The transmission network 112 may include terrestrial and/or satellite paths.

Content 104 transmitted over the transmission network 112 may be encoded and/or compressed. For example, the content may be compressed in accordance with a standard specifications, such as MPEG2 (ISO/IEC 13818-2), ITU-T H.264 (ISO/IEC 14496-10), VC-1 (SMPTE 421M), or MPEG4P2 (ISO/IEC 14496-2). The list of example compression standards is given in Table 1. Other compression and/or encoding schemes, including those not yet developed at the time of this application, may be used.

The compressed content 104 may be sent as a digital data stream to the end user or viewer 106 via the transmission network 112. The transmission network 112 may include transcoding or re-muxing stages. The Meta-Data 118 may be added or modified at any stage in the transmission network, or a multiple stages in the transmission network. This enables the Meta-Data to be adapted dependent upon factors such as regional differences or recipient characteristics or preferences. A receiver/decoder 114 at the content recipient's location is operable to decode the digital data stream and render video images that are displayed on a content playback device 116. Content playback device 116 may be a television, computer, audio system, hand held device, or other device.

A common feature of the compression schemes listed in Table 1 is that they allow for information to be embedded in the compressed content. In accordance with a first aspect, Meta-Data is embedded into certain sections of digital media streams. This Meta-Data enables feedback from the content recipient, as will be described below. The Meta-Data may be related to the content and may be selected dependent upon characteristics of the recipient (such as location, interests, behaviour, preferences etc.). The Meta-Data may be time dependent.

Meta-Data that is embedded into certain sections of digital media streams enables the content recipient to communicate back to content provider through any available return path. In one embodiment, the communication back to the content provider is via the Internet. However, other methods of communication may be used, including future methods.

Referring again to FIG. 1, the content provider 102 produces Meta-Data 118 that is passed to encoder/transmitter 110. The encoder/transmitter 110 embeds the Meta-Data into the digital media stream 104 that is transmitted to the content recipient 104. The digital media stream 104 is received by receiver/decoder 114 at the content recipient's location. When the stream is decoded, the Meta-Data is recovered. The receiver/decoder 114 may be a set-top-box, for example, or may be integrated with the content playback device 116.

Since the Meta-Data is embedded in the content data stream, the recovered Meta-Data is time-synchronized with the content that is displayed to the content recipient 106 on the content playback device 116. In a first mode of operation, visual prompts related to the Meta-Data are displayed on the content playback device 116. In a further embodiment, audio prompts are generated. A combination of both audio and visual prompts may be generated. In response to a prompt, the content recipient 106 may interact with a local control device 120, such as a remote control, smart phone, or personal computer that is local to the receiver/decoder 114, for example, to send a response signal 122 to the receiver/decoder 114. Upon receipt of the response signal 122, the receiver/decoder 114 may send data 124, related to the Meta-Data to the local control device 120 and may enter a second mode of operation. In the second mode of operation, the playback of the incoming content may continue, or the content may be stored for later playback. Also, in the second mode of operation, information stored in the Meta-Data is used to establish a link

TABLE 1

Example Video Coding Standards

| Video coding Standard | Summary |
| --- | --- |
| H.264/MPEG-4 Part 10 or AVC. (Formally, ISO/IEC 14496-10-MPEG-4 Part 10, Advanced Video Coding) | Advanced video coding for generic audiovisual services. Higher compression of moving pictures for various applications such as videoconferencing, digital storage media, television broadcasting, Internet streaming, and communication |
| MPEG2 (ISO/IEC 13818-2) | Generic coding method of moving pictures and of associated sound for various applications such as digital storage media, television broadcasting and communication |
| VC-1 (SMPTE 421M) | Compressed Video Bit stream Format and Decoding Process |
| MPEG4P2 (ISO/IEC 14496-2) | A video compression technology developed by MPEG. It belongs to the MPEG-4 ISO/IEC standards. It is a discrete cosine transform compression standard, similar to previous standards such as MPEG-1 and MPEG-2. Several popular codec's including DivX, Xvid and Nero Digital are implementations of this standard. | between the content recipient 106 and either the content provider 102 or a third party 126. In the embodiment shown in FIG. 1, the link is made via feedback network 128. Feedback network 128 may be the Internet or other communication network, or a combination of networks, for example.

In one embodiment, the Meta-Data 118 provides the Uniform Resource Locator (URL) of a resource on the Worldwide Web, and the local control device connects to that web resource via the feedback network 128 and link 130. Link 130 may be a wired or wireless link. For example, local control device 120 may be a smart 'phone that executes an Internet browser application. The URL may be associated with further media content, which in turn may include its own Meta-Data.

In a further embodiment, the receiver/decoder 114 connects to the feedback network 128 via link 132. In this embodiment, a graphical user interface may be displayed on the content playback device 116 and the content recipient may interact with the interface using the local control device 120 or another input device.

In a still further embodiment, the receiver/decoder 114 sends a signal back to the content provider 102 via the feedback network 128.

The link over feedback network 128 enables the content recipient 106 to exchange information with a server 134 operated by the content provider, or with a third party sever 126.

Prior content distribution systems provide one-way content delivery. In contrast, the system described above enables two-way communication between the content provider and the content recipient. The digital media stream 104 can be transmitted to content recipients via the Internet, via traditional transfer methods, via new transmission channels, or via combinations of many such means.

Using the information in the Meta-Data 118 embedded in the digital media stream 104, the content recipient 106 can quickly access a specific web page specified by the Meta-Data, either live or time-shifted. As discussed above, this content is usually in a compressed format that is received by receiver/decoder 114.

In one embodiment, the Meta-Data is embedded at the picture level or frame level in the video content. Various frame rates may be used, depending upon the format. Current video technologies uses a maximum of 120 frames or pictures per second, but future technologies and/or different regions may use faster or slower rates. Each compression standards provides a means, such as User Data fields, in each video frame or field that allows for Meta-Data to be embedded. The User Data field has equivalents each compression standard. Some of these are listed in Table 2.

TABLE 2

Example Data Fields for Meta-Data

| Video coding Standard | Suggested Data field in Compressed format |
| --- | --- |
| H.264/MPEG-4 Part 10 or AVC. (formally, ISO/IEC 14496-10-MPEG-4 Part 10, Advanced Video Coding) | SEI Payload, User data registered by ITU-T Rec. T.35 SEI message syntax, or User data unregistered SEI message syntax |
| MPEG2(ISO/IEC 13818-2) | User Data. |
| VC-1 (SMPTE 421M) | User Data. It is conveyed as bit-stream data units and may be included in the bit-stream at the sequence, entry-point, frame, field, or slice layers. |
| MPEG4P2 (ISO/IEC 14496-2) | User Data |

Table 2 lists some example data fields where Meta-Data can be embedded in digital media streams that are formatted in accordance with some common video coding standards. In the sequel, the term 'User Data field', will be used to describe any data field or similar section defined in a compression technology that enables user specific information to be embedded.

Each frame of the compressed content may be used to transmit Meta-Data. Since the data fields are time synchronized with the content, the Meta-Data may contain information that is associated with or relevant to the portion of content being played back, or relevant to various demographics, such as the recipient's personality traits or interests in relation to the content. The content being played back could contain, for example, an advertisement, an episode of a television show, a movie, a news broadcast, or a coverage sporting event or any media data.

Based on the information in the Meta-Data, any end element or network element in the path of content delivery that has sufficient Digital Rights Management (DRM) provisions can re-use, disseminate or manipulate the information. This provides a mechanism for adding value to the delivered content.

Some examples of Meta-Data information are listed in Table 3 below. Other information may be transmitted via the Meta-Data, depending on the type of user feedback or interaction desired.

TABLE 3

Some Examples of Meta-Data Information
Sample Parameters

Web URL
Product ID
Stock ID/SKU number
Number of items
Similar products
Name of Vendor
Rating of vendor
Type of Vendor
Content ID
Classification of Meta-Data
Original Transmission Date
Time Zone of Recipient
Expiration Date The content ID may be communicated back to the source of the Meta-Data so that a recipient response can be associated with the received content.

The classification of the Meta-Data, Original Transmission Date, and Expiration Date may be used to control how the decoder uses or presents the Meta-Data.

For example, Meta-Data may be discarded once its expiration date is passed.

Figure 2:
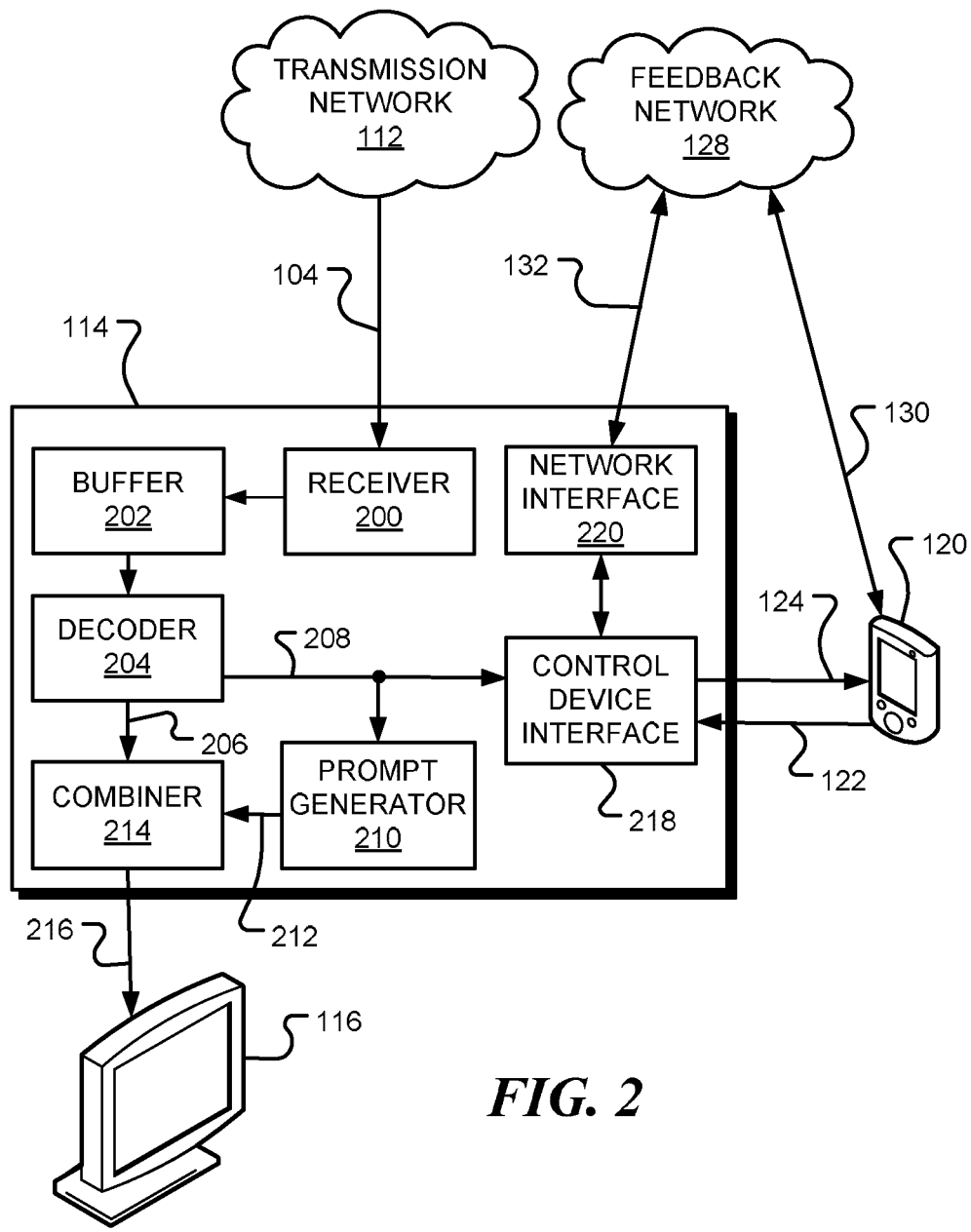
FIG. 2 is a block diagram of an exemplary receiver/decoder for real-time user feedback from digital media content in accordance with some embodiments.

FIG. 2 is a block diagram of an exemplary receiver/decoder 114 for real-time user feedback from digital media content in accordance with some embodiments. Referring to FIG. 2, the receiver/decoder 114 includes a receiver 200 operable to receive a content data-stream 104 from a transmission network 112, a buffer 202, operable to buffer the content data-stream, and a decoder 204 that recovers the content 206 and Meta-Data 208 embedded in the data-stream. The Meta-Data 208 is used in prompt generator 210 to produce an audio and/or visual prompt 212. Combiner 214 adds any audio prompt to the audio portion of the playback signal 216. Combiner 214 also superimposes any visual prompts on the visual portion of the playback signal 216. The playback signal 216 drives the content playback device 116. In this way, the content recipient (the viewer/listener) is made of aware of when Meta-Data relating to the current content is available. The content recipient may then use the local control device 120 to send a signal 122 to a local control device interface 218 of the receiver/decoder 114. Upon receipt of the signal 122, the receiver/decoder 114 may establish a two-way communication link to the control device.

In one embodiment, the Meta-Data 208, or data 124 derived from the Meta-Data, is transmitted to the local control device 120, or any other network-enabled electronic device of the recipient. The data 124 may then be used by the local control device or any other network-enabled electronic device to affect communication using a feedback network 128, such as the Internet. For example, the Meta-Data 208 and/or data 124 may describe an address on the worldwide web.

In a further embodiment, the Meta-Data 208, or data derived from the Meta-Data, is used by a network interface circuit 220 of the receiver/decoder 114 to affect communication with the feedback network 128.

In either embodiment, once communication is established, interaction with the feedback network 128 may be controlled via a graphical user interface displayed on the content playback device 116, on the local control device 120, or on another network enabled device of the recipient.

The receiver/decoder 114 may be implemented, as least in part, on a programmed processor. Some, or all, of the elements of receiver/decoder 114 may be located within a common housing, such as a set top box. Links 130 and 132 enable recipient access to feedback network 128.

Figure 3:
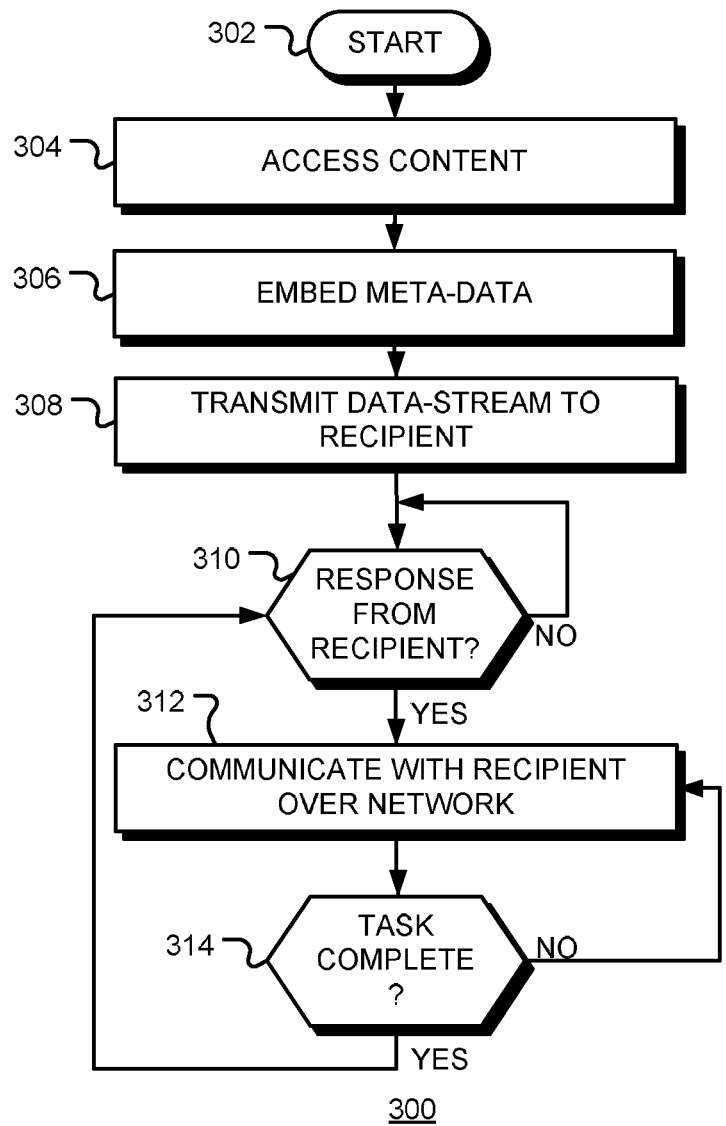
FIG. 3 is a flow chart of a method for real-time user feedback from digital media content in accordance with some embodiments.

FIG. 3 is a flow chart 300 of a method for real-time user feedback from digital media content in accordance with some embodiments. Following start block 302 in FIG. 3, a content provider accesses digital content at block 304. At block 304, Meta-Data relating to the content is embedded into the content. The Meta-Data may be embedded into User Data fields associated with particular frames of a digital video data sequence, for example, and may be time correlated with the content in those frames. At block 308, the content data-sequence, with the embedded Meta-Data is transmitted as a data stream to one or more recipients. At decision block 310 the content provider, or a third party, waits for a response from the recipient. A response may be received at a time when a recipient plays back the content. This may be at the time of transmission of the data-stream, or sometime thereafter. In one embodiment, this is indicated by a communication received from the recipient via a network such as the Internet. The communication may include an identifier that identifies the particular Meta-Data that is being responded to. The communication may be received by the content provider, or by a third party. The third party may be the originator of the Meta-Data. If a response from a recipient is received, as indicated by the positive branch from decision block 310, a communication may be established at block 312 with the responding recipient. For example, if the Meta-Data were related to an offer to purchase specific goods or services, a link may be made to an appropriate entity, such as a web server, portal, service, or active technical entity, that provides further information and purchasing facilities. In a further example, if the Meta-Data offered the recipient an opportunity to cast vote relating to the content being viewed, the communication may just be an acknowledgment that the vote was received.

Once the communication has been completed, as indicated by the positive branch from decision block 314, flow returns to block 310 to wait for further responses.

The method 300 enables real-time feedback from a recipient of media content, represented by a digital media data sequence, to be transmitted to content recipients. Meta-Data, related at least in part to the content of the frames, is added to frames of the digital media data sequence. After transmission, a feedback network is monitored for a response from a content recipient, the response being dependent upon the Meta-Data. Once a response is received the response may be recorded and/or a network link may be established with the content recipient via the network. Examples of Meta-Data include: a network address identifier, product information, vendor information, recipient information, a content identifier, a Meta-Data Classifier, a content transmission time, and a Meta-Data expiration time. The Meta-Data may be stored in a User Data field of the digital media data sequence.

Figure 4:
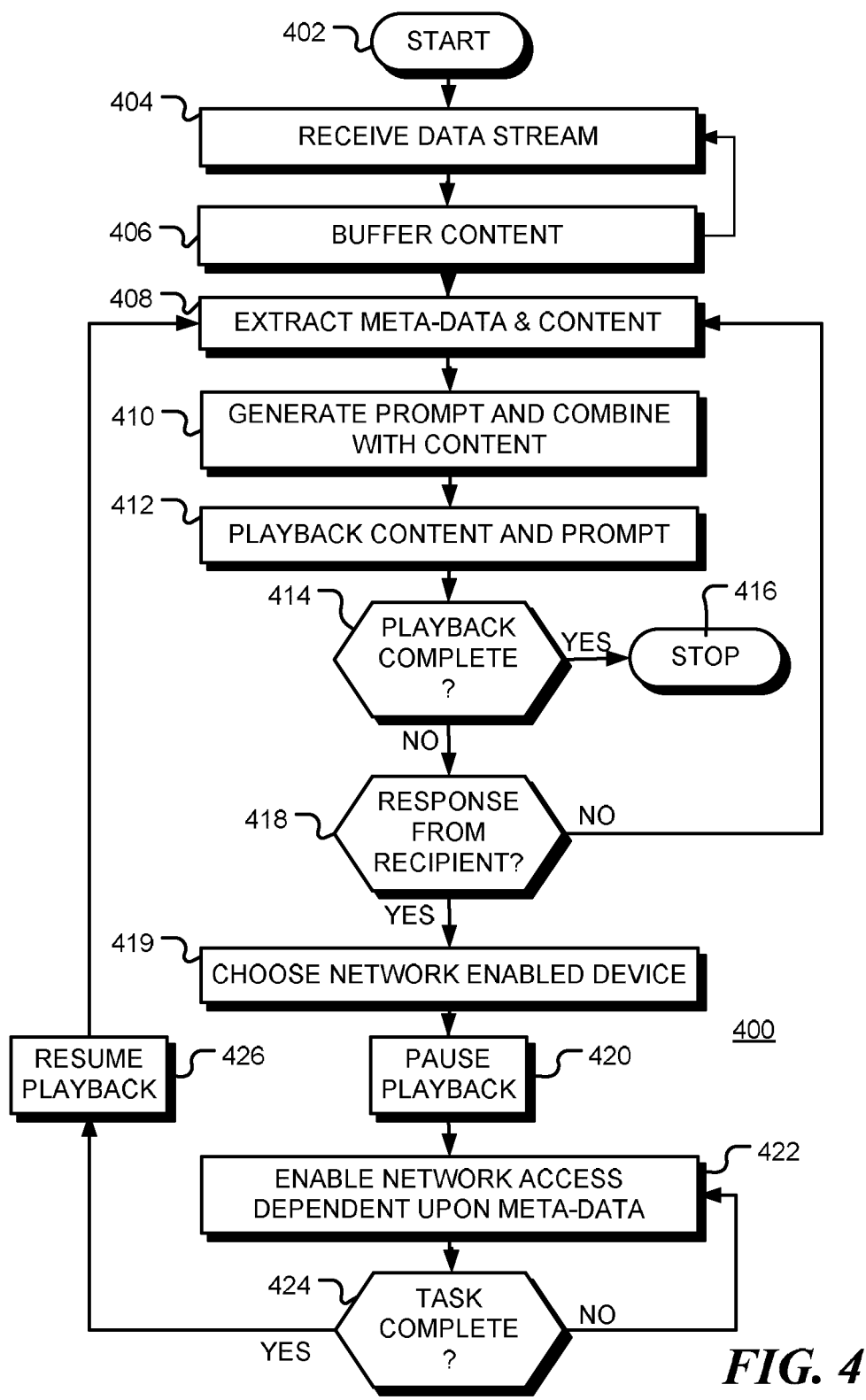
FIG. 4 is a further flow chart of a method for real-time user feedback from digital media content in accordance with some embodiments.

FIG. 4 is a further flow chart 400 of a method for real-time user feedback from digital media content in accordance with some embodiments. The method may be implemented in a set top box or other electronic device. Following start block 402 in FIG. 4, a content data stream with embedded Meta-Data is received at block 404. The content data stream may be optionally buffered at block 406 as needed. For example, the entire content of a program may be stored (recorded) in the buffer to allow for content playback at a later time. In other circumstances, buffering may or may not be needed depending upon the end user's device. The Meta-Data may include timing information, such as the time of the air of original offer and/or an expiration date of the offer. This information may be checked against the current time to determine, for example, if an offer is still valid or a link is still available.

Alternatively, playback may begin before the entire content has been received. At block 408, the content data stream is decoded and the Meta-Data and content are extracted. At block 410, an audio and/or visual prompt is generated from the extracted Meta-Data. The prompt may be combined with the content. In one embodiment, the prompt is displayed as a window, subtitle, icon or overlay in the pictures to be played back. In a further embodiment, an audio prompt, such as speech or other sound is added to the audio portion of the content. A combination of these approaches may be used. The combined content and prompt are played back at block 412. If playback has been completed, as depicted by the positive branch from decision block 414, the method terminates at block 416. Otherwise, as depicted by the negative branch from decision block 414, as check is made at decision block 418 to determine if the recipient has responded to the prompt. If the content recipient responds to the prompt using a control device, as depicted by the positive branch from decision block 418, playback of the content may be paused at block 420 to allow user interaction. Meanwhile, as depicted by the arrow from block 406 to block 404, the incoming data stream continues to be received at block 404 and buffered at block 406. Buffering the received data-stream ensures that content is not lost while the playback is paused. In some applications, such as real-time voting, playback may continue without pause. In this embodiment, network access is enabled at block 422 dependent upon the Meta-Data. In case the end receiver is not capable of recording, the recipient may stall the media playback and resume the playback after consumption of information gleaned from the Meta-Data.

The Meta-Data request may be sent to an allied network enabled device that can service the request, such as at optional block 419. This allows the recipient to decide to continue browsing on a local laptop, for example, or to send this request to a user on any device on the connected network, thereby avoiding interruption of content playback. Other examples of a network enabled device may include, but not be limited to, tablet, cell phone, smart phone, computer, etc.

The Meta-Data may contain parameters such as those listed in Table 3 above. In one embodiment, the Meta-Data includes a URL for the world-wide web. Once network access has been completed, as depicted by the positive branch from decision block 424, playback is resumed at block 426 and flow continues to block 408. The Meta-Data is related to the content being displayed, so the method described in flow chart 400 enables content-driven feedback via the network.

The method described in flow chart 400 provides real-time feedback from a recipient of digital media content. A content data stream is received and the digital media content is extracted from the content data stream and a playback signal dependent upon the digital media content. The embedded Meta-Data is also extracted from the content data stream. If a response signal is received from a local control device of the content recipient, network access is enabled dependent upon the extracted Meta-Data. The Meta-Data may be related to the digital media content of the content data stream. Network access may be enabled by transmitting data, dependent upon the Meta-Data, to a network-enabled device of the content recipient, which may be the recipient's local control device or another designated device, such as computer or smart 'phone.

The media data stream may be buffered so that generation of the playback signal can be paused during network access.

A prompt may be generated dependent upon the extracted Meta-Data. This may be, for example, a visual prompt, an audio prompt and a combination of a visual prompt and an audio prompt. In one example, the prompt is generated by combining the prompt with the extracted digital media content to produce the playback signal. In a further example the prompt is generated independent from the playback signal.

The Meta-Data may specify a network address identifier, such as a Web URL for example, that is used to access the feedback network.

Content driven feedback, as described above enables a recipient to respond directly to a commercial or advertisement being viewed on a real-time basis. Even if the content is viewed in a time-shifted mode, the recipient is able to act on the embedded Meta-Data immediately. In prior approaches, content is delivered by unidirectional or broadcast methods. Information, such as a telephone or web address may be presented on a screen during a commercial, but there is no technique to automatically transfer associated data to the viewer. A viewer might have to find pen and paper, copy down the information, activate a network enabled device and then type in the transcribed information. This manual approach is inconvenient, prone to transcription error, and very limited in the amount and type of information that may be transferred. In contrast, certain embodiments allow much more information to be transferred, and the information is transferred automatically and accurately if the recipient chooses to respond to a prompt. The embedded Meta-Data associated with the content that is being played provides a mechanism for a bi-directional dialogue from anywhere within the spectrum of content delivery mechanisms.

The viewer can defer his/her decisions to act on requested information or react immediately.

In one embodiment, a content producer/provider/distributor can count how many times a particular video is watched in full and whether it is streamed live or time-shifted. This provides information to help content developers design programming methods, commercial content, etc. In this embodiment, the embedded Meta-Data, when extracted during playback, automatically provides feedback information via the network as the recipient plays back the content. Recipient feedback is still provided, since the recipient controls when the playback of the content is started, stopped, fast-forwarded, rewound, etc.

The examples presented herein may enable real-time feedback of programs or feedback using television remote controls or using some key inputs.

Applications include commercials, advertising, surveying, profiling, and cable Multiple System Operators (MSO's) services.

In one example application, a recipient playing back video content views an advertisement for a product. A prompt, such as a 'buy now' icon, may be presented to the recipient indicating that information associated with the product is available. (Alternatively, the advertisement itself may be considered to be the prompt). If the recipient wishes to purchase that product, the recipient can press a button on a control device. Information contained in the Meta-Data embedded in the content data stream of the advertisement enables the recipient to instantly access the web page of the advertising company, via the Internet, and either buy the product or find out more information regarding the product. This method enables a bi-directional dialogue between the user and the seller. In this embodiment, the seller might provide both Meta-Data and content to the content distributor.

In a further application, Meta-Data may be embedded in content to allow for voting. During playback of a program, such as a debate or a game show for example, a viewer may be given an opportunity to vote on a particular issue. This enables program makers to survey viewers. In this application, the information to enable feedback via the network is contained on the Meta-Data. The recipient's response, and possibly other information such as the time of the response, is sent via the network to location specified in the Meta-Data. The response may be sent to content provider or distributor or to any other location.

Figure 5:
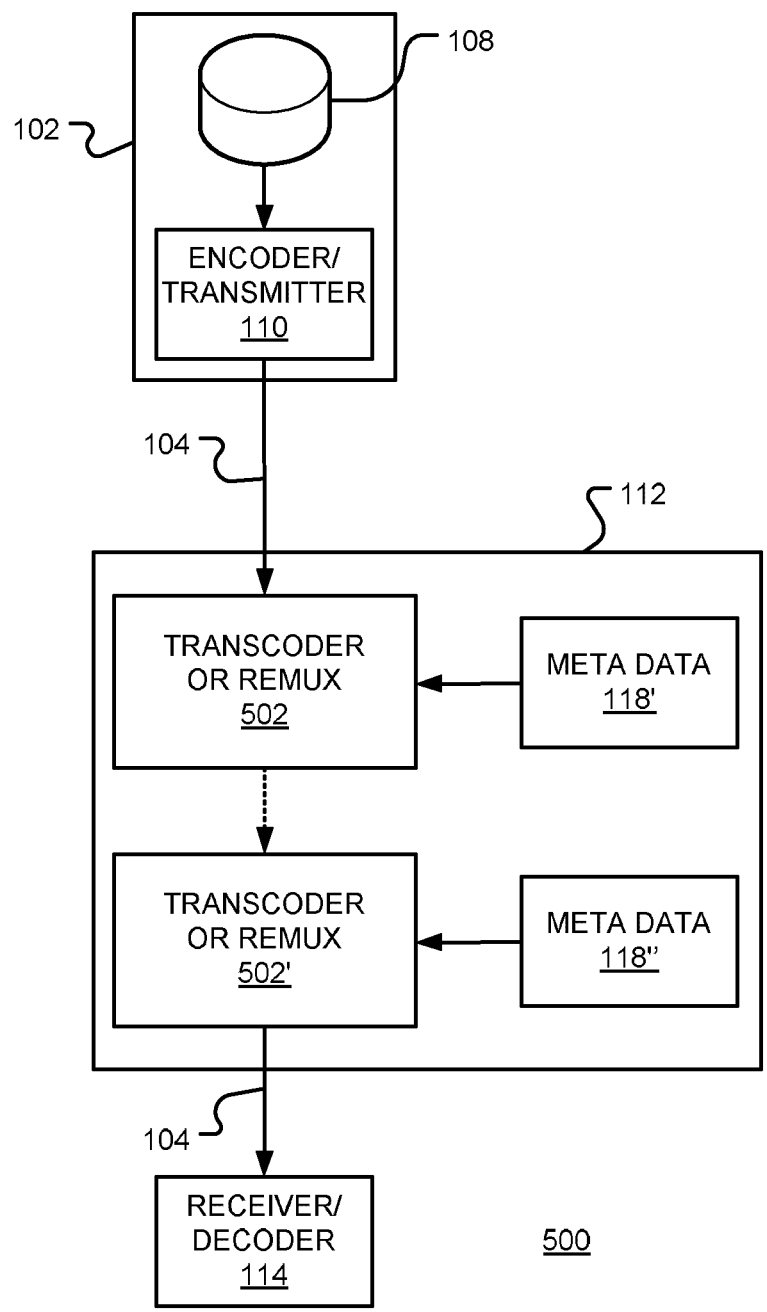
FIG. 5 is a block diagram of an exemplary system for distributing digital media content in accordance with some embodiments.

FIG. 5 is a block diagram 500 of a further exemplary system for distributing digital media content in accordance with some embodiments. When digital media content 104 is distributed through a transmission network 112, the content may be altered at various stages in the network. For example, different geographical regions may use different compression technologies. This requires that the content be trans-coded before being delivered to the region. The content mix may be altered at various stages in the distribution network. For example, local news and local advertisements may be multiplexed with other programming for delivery to specific regions. In the system shown in FIG. 5, new Meta-Data 118' and 118" is embedded in the digital media content 104 at one or more stages 502 and 502' in the transmission network 112. The stages may be trans-coders, or re-multiplexers (remixes), for example, or a custom stages for Meta-Data embedding. The Meta-Data may be specific to a particular geographical region for example, of may be specific to the intended recipient. The Meta-Data may replace other Meta-Data previously embedded in the digital media content 104. Thus, the Meta-Data reaching the receiver/decoder 114 of the final recipient may be different to the original Meta-Data and may be customized for the final recipient.

Figure 6:
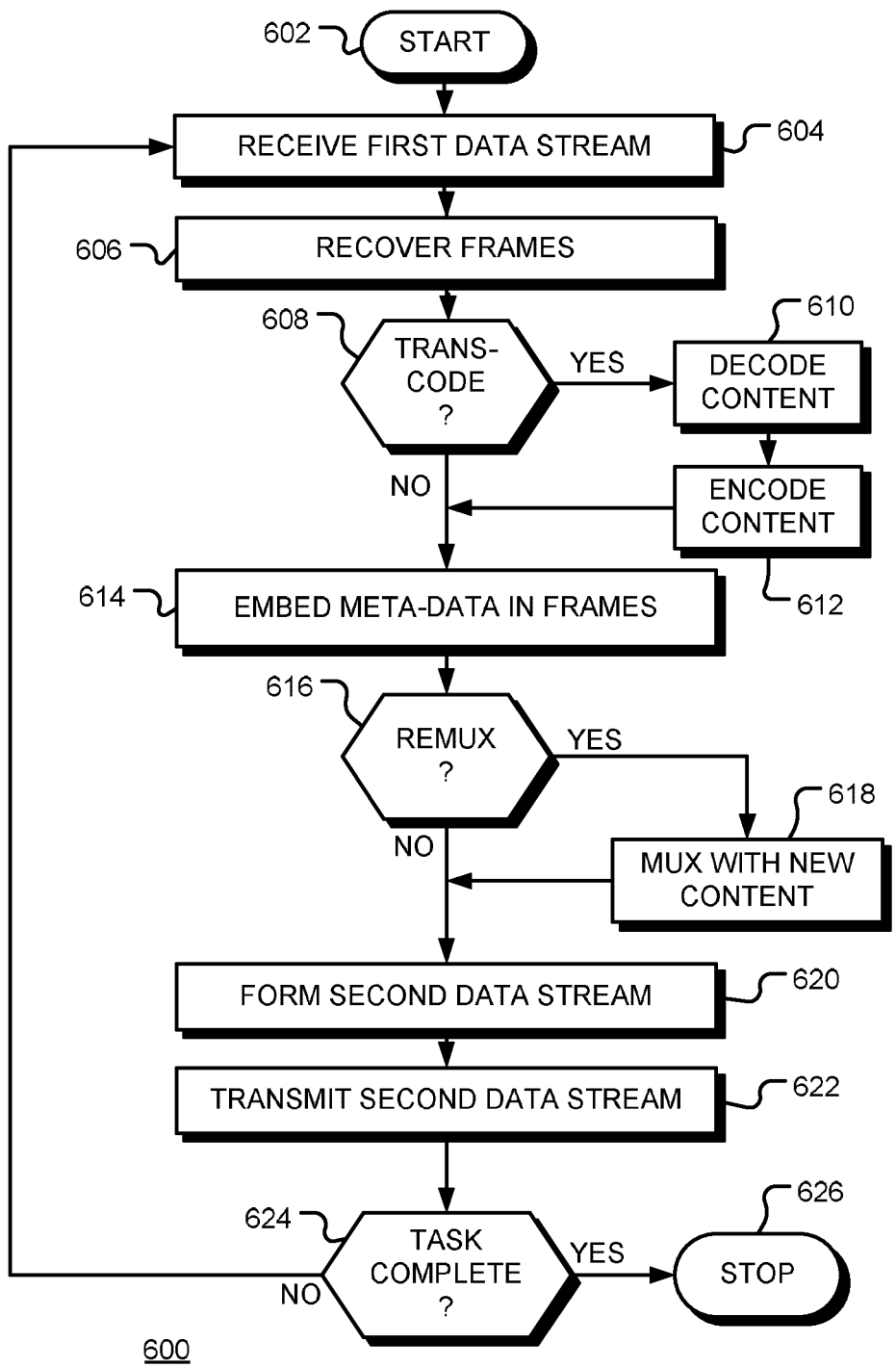
FIG. 6 is a flow chart of a method for enabling feedback from a recipient of digital media content in accordance with some embodiments.

FIG. 6 is a flow chart 600 of a method for enabling feedback from a recipient of digital media content in accordance with some embodiments. Following start block 602, a first content data stream in a transmission network is received at block 604. The first content data stream contains a plurality of frames of first media content. At block 606, one or more frames of the plurality of frames from the content data stream are recovered to produce one or more recovered frames. If the received data stream is to be trans-coded by decoding from one compression format and then re-coding to another, as depicted by the positive branch from decision block 608, the media content is recovered (decoded) from the received data stream at block 610 and is recoded according to a different compression scheme at block 612. At block 614, the one or more recovered (and possibly trans-coded) frames are modified by embedding Meta-Data in a data field of the recovered frames to produce one or more modified frames. Optionally, as depicted by the positive branch from decision block 616, the received media content may be re-multiplexed with other media content at block 618. For example, region-specific programming or advertisements may be added or used to replace received content. At block 620, a second content data stream is formed. The second data content stream contains the one or more modified frames and newly multiplexed content. At block 622 the second content data stream is transmitted to the recipient via the transmission network. Thus, Meta-Data is transmitted to the recipient and feedback from the recipient is enabled via a feedback network that is accessible in accordance with the Meta-Data. When all data have been transmitted, as depicted by the positive branch from decision block 624, the process terminates at block 626, otherwise flow returns to block 604 and the process continues. The method 600 may be performed in a re-multiplexer, trans-coder or other network device.

In the foregoing specification, specific embodiments have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

While this detailed description has set forth some embodiments of the present invention, the appended claims cover other embodiments of the present invention which differ from the described embodiments according to various modifications and improvements. For example, the appended claims cover embodiments of the invention that utilize compression techniques, transmission networks and/or feedback networks not described above, including those not yet developed.

Within the appended claims, unless the specific term "means for" or "step for" is used within a given claim, it is not intended that the claim be interpreted under 35 U.S.C. 112, paragraph 6.

What is claimed is:

1. An apparatus for enabling feedback from a recipient of digital media content, the apparatus comprising:
a receiver operable to receive a content data stream containing media content and embedded Meta-Data;
a decoder operable in a first mode to decode the content data stream to extract the media content and the Meta-Data and to pass a playback signal to a content playback device of the content recipient;
a control device interface operable to receive a signal from a control device of the content recipient; and
a network interface operable to provide feedback by accessing a network in accordance with the Meta-Data and the signal from the control device of the content recipient,
where the embedded Meta-Data is time-synchronized with the media content, and
where, upon receipt of the signal from the control device of the recipient, the decoder is operable in a second mode in which playback is paused and a user interface related to the media content is displayed on the content playback device to enable interaction between the control device of the content recipient and the control device interface.

2. An apparatus in accordance with claim 1, further comprising a buffer operable to store the content data stream.

3. An apparatus in accordance with claim 1, wherein the network interface comprises an interface to a network-enabled electronic device remote from the receiver and the decoder, and wherein the network interface is operable to transmit information, dependent on the Meta-Data, to the network-enabled electronic device upon receipt of the signal from the control device.

4. An apparatus in accordance with claim 3, wherein the interface to the network-enabled electronic device comprises an interface to the control device.

5. An apparatus in accordance with claim 1, wherein the receiver, decoder, control device interface and network interface are located in a common housing.

6. An apparatus in accordance with claim 1, further comprising:
a prompt generator operable to generate a prompt dependent upon the extracted Meta-Data; and
a combiner, operable to combine the prompt and extracted media content to produce the playback signal.

7. An apparatus in accordance with claim 6, wherein the prompt is selected from the group of prompts consisting of a visual prompt, an audio prompt and a combination of a visual prompt and an audio prompt.

8. An apparatus in accordance with claim 1, wherein the network interface comprises an interface to the Internet.

9. An apparatus in accordance with claim 1, further comprising a content playback device responsive to the playback signal.

10. A method for enabling real-time feedback from a recipient of media content to be transmitted to a plurality of content recipients, the media content being represented by a digital media data sequence and the method comprising:
receiving the digital media data sequence from a content provider;
determining if an access right to the digital media data sequence exists;
if the access right exists, adding time-sensitive Meta-Data to frames of the digital media data sequence, the Meta-Data related to the content of the frames;
transmitting the digital media data sequence to the plurality of content recipients;
monitoring a network for a response from a content recipient of the plurality of content recipients, the response being dependent upon the Meta-Data; and
establishing a network link with the content recipient via the network dependent upon the response from the content recipient.

11. A method in accordance with claim 10, wherein the Meta-Data comprises data selected from the group of data consisting of: a network address identifier, product information, vendor information, recipient information, a content identifier, a Meta-Data Classifier, content transmission time, and Meta-Data expiration time.

12. A method in accordance with claim 10, wherein adding Meta-Data to frames of a digital media data sequence comprises storing the Meta Data in a User Data field of the digital media data sequence.

13. A method for providing real-time feedback from a recipient of digital media content, the method comprising:
receiving a content data stream;
extracting the digital media content from the content data stream;

extracting Meta-Data from the content data stream, the Meta-Data including an expiration date;

generating a playback signal dependent upon the digital media content; and upon receipt of a response signal from control device of the content recipient;

determining if the expiration date of the Meta-Data is passed;

if the expiration date is not passed, enabling network access dependent upon the Meta-Data, where the Meta-Data is related to the digital media content of the content data stream.

14. A method in accordance with claim 13, wherein enabling network access dependent upon the Meta-Data comprises transmitting data, dependent upon the Meta-Data, to a network-enabled device of the content recipient.

15. A method in accordance with claim 14, wherein the network-enabled device of the content recipient comprises the control device.

16. A method in accordance with claim 13, further comprising:

buffering the media data stream; and pausing the generation of the playback signal during network access.

17. A method in accordance with claim 14, further comprising:

generating a prompt dependent upon the extracted Meta-Data; and combining the prompt with the extracted digital media content to produce the playback signal.

18. A method in accordance with claim 17, wherein the prompt is selected from the group of prompts consisting of a visual prompt, an audio prompt and a combination of a visual prompt and an audio prompt.

19. A method in accordance with claim 13, wherein enabling network access dependent upon the Meta-Data comprises enabling connection to a network address identifier specified in the Meta-Data.

20. A method in accordance with claim 19, wherein the Meta-Data comprises a Web URL.

21. A method for enabling feedback from a recipient of digital media content, the method comprising:

receiving a first content data stream in a transmission network, the first content data stream containing a plurality of frames of a first media content;

recovering one or more frames of the plurality of frames from the content data stream to produce one or more recovered frames;

determining if an access right to the digital media data sequence exists;

if the access right exists, modifying the one or more recovered frames by embedding time-sensitive Meta-Data in a data field of the one or more recovered frames to produce one or more modified frames, the Meta-Data including an expiration date;

forming a second content data stream containing the one or more modified frames; and transmitting the second content data stream to the recipient via the transmission network, where, if the expiration date has not expired, feedback from the recipient is enabled via a feedback network that is accessible in accordance with the Meta-Data.

22. A method in accordance with claim 21, wherein the first content data stream is encoded using a first compression technique and wherein recovering one or more frames of the plurality of frames from the content data stream comprises:

decoding the first content data stream to recover the digital media content; and encoding the digital media content in accordance with a second compression technique to produce the one or more recovered frames.

23. A method in accordance with claim 21, wherein forming the second content data stream containing the one or more modified frames comprises:

multiplexing the one or more modified frames of the first content data stream with a data stream containing a second media content.

* * * * *